UNITED STATES PATENT OFFICE.

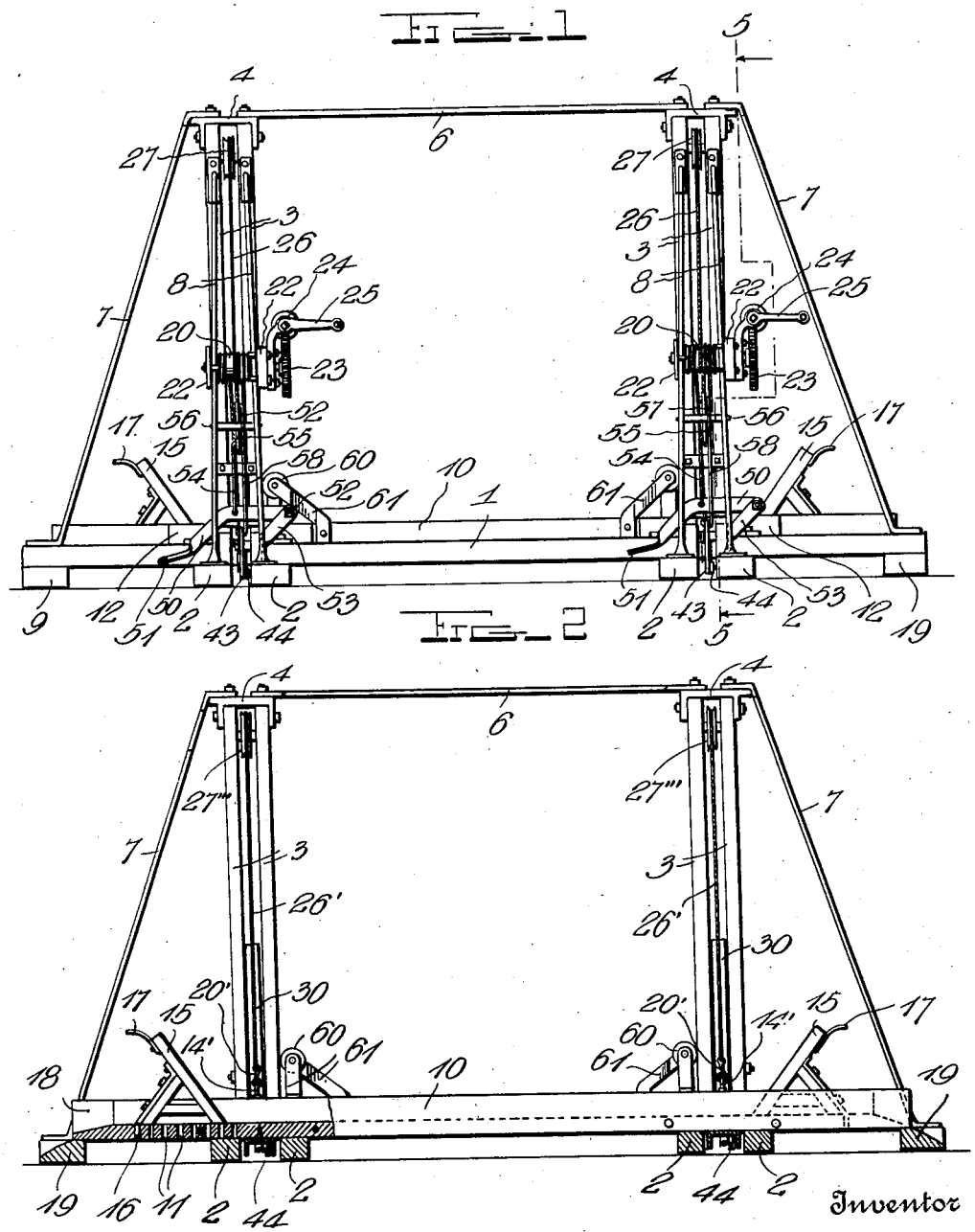

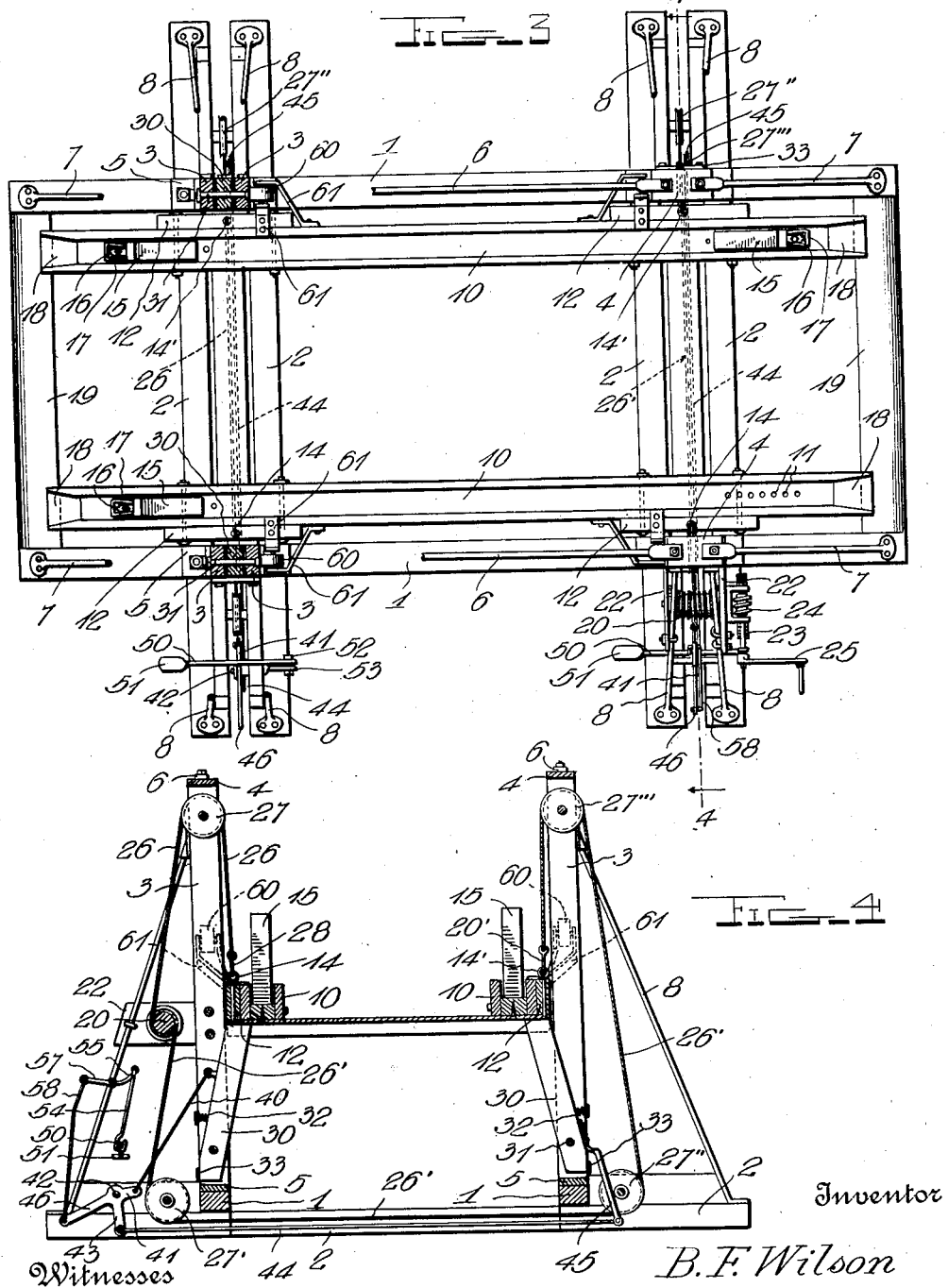

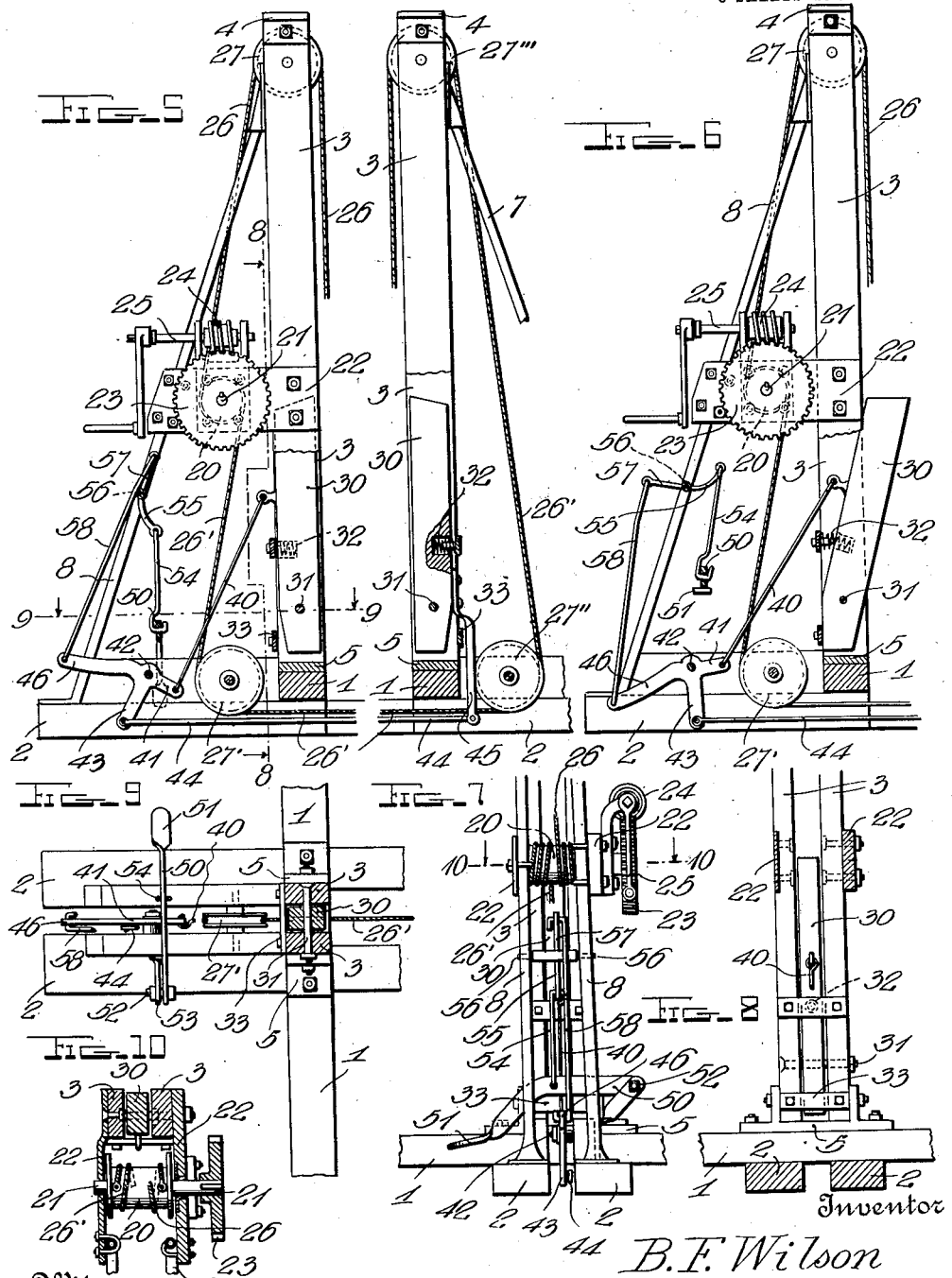

BENJAMIN F. WILSON, OF HASTINGS, NEBRASKA.

AUTOMOBILE-ELEVATOR.

1,032,975.

Specification of Letters Patent.

Patented July 16, 1912.

Application filed April 17, 1912. Serial No. 691,460.

*To all whom it may concern:*

Be it known that I, BENJAMIN F. WILSON, a citizen of the United States, residing at Hastings, in the county of Adams and State of Nebraska, have invented certain new and useful Improvements in Automobile-Elevators; and I do declare the following to be a full, clear, and exact description of the invention, such as will enable others skilled in the art to which it appertains to make and use the same.

This invention relates to elevators, and more especially to that class of devices known as automatic stops; and the object of the present invention is to produce an improved and easily operated mechanism by means of which a heavy vehicle such as an automobile may be raised the desired distance from the ground and held suspended while the workman has free access to the mechanism underneath.

More especially the invention contemplates the provision of stops for positively holding the elevator and its load in raised position, and a peculiar form of foot actuating control devices for setting the stops in active or inactive position.

Finally the invention contemplates the provision of other details of construction, such as chocks for holding the wheels on the tracks of the platform, the guides coacting with the standards so that one end only of the platform may be elevated, and other points which will be brought out in the following specification and claimed, and which are shown in the drawings wherein—

Figure 1 is a front elevation of this machine complete, and Fig. 2 is a central longitudinal sectional view thereof; Fig. 3 is a plan view, partly in horizontal section; and Fig. 4 is a vertical cross section on the line 4—4 of Fig. 3 with the carriage elevated; Fig. 5 is an enlarged vertical section taken substantially on the line 5—5 of Fig. 1 and foreshortened to show two standards; and Fig. 6 is a similar view with the front stop-controlling mechanism in a different position; Fig. 7 is an enlarged front elevation of the lower end of one of the standards and the mechanism carried thereby; Fig. 8 is a vertical section on the line 8—8 of Fig. 5, and Fig. 9 is a horizontal section taken substantially on the line 9—9 of Fig. 5; Fig. 10 is a sectional detail on the line 10—10 of Fig. 7.

The frame of this machine in the embodiment illustrated in the drawings consists of a pair of spaced longitudinal sills 1 connected near their ends by two pairs of cross beams 2; a pair of standards 3 rising from the points of intersection between the sills and beams, and each made of two posts with spacing blocks 4 and 5 secured between them; bars 6 connecting the upper ends of said standards, and oblique braces 7 and 8 for holding said standards rigidly in vertical position. The bars and braces may be of metallic rods, while the other parts may well be beams (although metal could be employed), and the specific connection between all the parts need not be elaborated. The size of this frame work is sufficient to admit the vehicle to be elevated, and if the same be an automobile the length of the frame work will be about that of the car having the greatest wheel base and of standard width.

The platform consists of a pair of channeled rails 10 whose length is about that of the sills, the bottom of each channel being provided with a series of perforations 11 for a purpose to appear below, wear plates or blocks 12 bolted to the outer side of each rail and adapted to contact with the inner faces of the standards, and cross ties connecting said rails at suitable points. The rails carry eye bolts 14 and 14' opposite the standards for a purpose to appear. Coacting with the channeled rails are four chock blocks 15, each having a substantially triangular body with a downturned spur 16 adapted to enter one of said perforations 11 and a handle 17 at the outer end of the body by which it may be moved; and the object of these chock blocks is to hold the vehicle against movement upon the rails of the platform. The extremities of the rails are widened and beveled as at 18, and two beveled approaches 19 are disposed between the extremities of the sills 1 so that a vehicle can easily be run over the approach and up the beveled ends into and along the rails in a manner which will be clear.

The elevating mechanism is best seen in Figs. 4 and 5. It comprises a drum 20 whose shaft 21 is journaled in bearings 22 carried by one of the standards, and the shaft is provided with a worm wheel 23 engaged by a worm 24 on a crank shaft 25 whose handle may be rotated by hand or power as desired; and this drum is connected with the platform by a pair of ropes, one of them numbered 26 leading upward over a pulley 27 journaled at the upper end of the standard and downward to a hook 28 which engages one of said eyes 14 in the platform, while the other rope 26' passes downward under suitable pulleys 27' and 27" (between which it is led across the base in the space between the beams 2), thence upward over a pulley 27''' at the top of the standard at this side of the machine, and downward to a second hook 20' engaging the eye 14' at this side of the platform. It will be seen that an operator standing on one side of the machine can turn the crank handle 25 to raise both edges of the platform at this end of the machine, and another operator at the other end thereof can raise the other end of the platform simultaneously or at other times. If both ends are raised at once the platform ascends in a level position, whereas if one end is raised at a time the platform will obviously be inclined as is sometimes desirable; and in either case the chock blocks will be useful. The distance to which the platform is raised will depend on circumstances and conditions. If the vehicle being elevated is an automobile, it will be quite natural that it should be raised sufficiently high for the workman to pass beneath and work there while standing, although at times it will be sufficient to raise the vehicle only far enough to permit the mechanics to work while sitting there. As the windlasses are driven by worms on the shaft of the crank handle, the latter may be turned in one direction to raise the platform and in the other direction to lower it, and the platform will remain at any elevation at which it is placed; but in order that the platform will be absolutely supported at the proper height for the mechanics to work beneath it in safety, absolutely free from danger that it will descend with the weight of a heavy automobile upon it, I preferably make use of the mechanism next to be described and which constitutes a positive support for the platform at a proper height to permit the mechanics to work beneath an automobile.

The automatic stops are four in number, each disposed between the beams which constitute a standard, and as they are alike I need describe but one. Each consists of a beam 30 mounted near its lower end on a bolt 31 connecting the two members of the standard and having its upper end borne normally inward beneath the rails by means of an expansive spring 32, a stop 33 limiting its inward movement. With this construction within all four of the standards, it follows that when the platform is raised to the point shown in Fig. 4, the springs 32 press the upper ends of the stops 30 inward and the platform is reliably and positively supported, whether the windlasses are reversed or not, and even if the ropes should break. The trip mechanism for actuating said stops comprises for each of them a link 40 connecting them to the beam 30 near its upper end and lets them downward to a three-arm lever 41 pivoted between the outer extremities of the cross beams 2 at the point 42, the lower arm 43 of this lever being connected by a cross link 44 running across the machine between the two beams 2 to the other side of the machine, with an arm 45 depending rigidly from the beam 30 of the automatic stop at that side of the machine, so that when the stop at one side is moved outward the stop directly opposite will be moved outward at the same time. The third and outermost arm 46 of the lever 41 might be said to be a handle, but is preferably manipulated by foot-mechanism best seen in Figs. 5 and 7. The foot-mechanism consists of a treadle 50 having a foot piece 51 at one end and pivoted at its other end at 52 to a bracket 53 on the frame work, its midlength being connected to a link 54 with one arm 55 of a rock lever which is pivoted at 56 in a suitable support above the three-way lever 41; and the other arm 57 of this rock-lever is connected by a link 58 with the handle end or outer arm 46 of the lever 41. As there is one of these foot mechanisms for each trip mechanism, and one of the latter at each end of the frame work, there must be two such for the complete machine as will be clear. It will be observed that the two arms 55 and 57 of the rock lever are not directly opposite the pivot 56, and therefore when it is rocked from the position shown in Fig. 5 to that shown in Fig. 6, and back again, it remains at one extreme of this movement or the other. Such rocking is obviously effected by depressing the foot piece 51 of the treadle 50, or raising said foot piece by depression thereof throwing the rock lever to the position shown in Fig. 5, and raising thereof turning the rock lever to the position shown in Fig. 6. Simultaneously with the movement of the rock lever, the three-arm lever 41 is turned as shown in these views, and depression on the automatic stop is also illustrated. It follows that the foot mechanism at either end of the machine may be manipulated to permit the automatic stops to swing inward under the elevated platform, or to retract said stops against the tension of that spring and to hold them retracted because the upper end of the upper arm 57 of the rock lever moves beyond a direct line through its extremity and the outer end of the three-arm lever, and the pivotal point which exists between them. It will obviously be necessary to give the crank handle 25 a few turns so as to raise the weight of the platform and the car of the automatic stop, before the mechanism for retracting said stops is actuated. It is quite possible to raise and lower the platform without using the stops at all, as where the vehicle is light such as in the case of a buggy, or where the vehicle is to be raised to a considerable height or to but a little height, either higher or lower than it would be supported upon the upper end of the stops.

The uses of this machine as a whole will be obvious. The automobile or other vehicle to be treated is run onto the platform while the latter is depressed, the chock blocks put into place to hold the vehicle from movement in either direction, and the crank handles both manipulated to cause the windlasses to draw on the ropes and raise the platform at both ends thereof, or when only one is manipulated to raise one end of the platform if that be desired. The mechanics then do their work beneath the car, and the latter is firmly supported upon the automatic stops which as has been shown cannot be retracted while the weight of the platform and the vehicle is upon them, and can only be retracted after this weight has been lifted off. After the work is finished, the platform is lowered, the chocks removed, and the vehicle run out of place.

The exact sizes, shapes, proportion and materials of parts are unimportant; and changes in or additions to the details may be made without departing from the spirit of my invention. One important refinement which is illustrated in the drawings consists of guide rollers 60 journaled in brackets 61 carried by the edges of the platform, the two rollers at each side thereof facing oppositely and contacting with the inner edges of the two standards at that side of the machine, so that the platform may be raised and lowered while level or may be raised and lowered at either end and the rollers will guide it under either condition.

What is claimed as new is—

1. In an elevator of the character described, the combination with a frame work consisting of parallel sills, cross beams connecting them, and standards rising from said beams; and a platform movable vertically between said standards and including channeled rails whereof each has a series of perforations near its extremities and the latter widened and flattened; of beveled approaches adapted to coact with the extremities of the rails when the platform is lowered, and triangular chock blocks adapted to fit within the channels of the rails, and each having a depending spur engaging one of said perforations.

2. In an elevator of the character described, the combination with a frame work, a platform disposed therein and provided with channeled rails for the reception of the wheels of a vehicle, and elevating mechanism carried by the frame work for raising and lowering said platform; of stops pivoted at their lower ends to the frame work, springs bearing their upper ends normally inward beneath the platform when the latter is raised, means for limiting the inward movement of said upper ends, and trip mechanism for retracting said ends.

3. In an elevator of the class described, the combination with a frame work, a platform disposed therein and having channeled rails for the reception of vehicle wheels, triangular chock blocks adapted to fit within the channels, and elevating mechanism carried by the frame work for raising and lowering said platform; of stops pivoted at their lower ends to the frame work, springs bearing their upper ends normally inward beneath the platform when the latter is raised, means for limiting the inward movement of the upper ends, a treadle pivoted in the frame work and having a foot piece, and connections between said treadle and the various stops for retracting the latter against the tension of their springs.

4. In an elevator of the character described, the combination with a frame work, a platform disposed therein and provided with channeled rails for the reception of the wheels of a vehicle, and elevating mechanism carried by the frame work for raising and lowering said platform; of stops pivoted at their lower ends to the frame work, springs bearing their upper ends normally inward beneath the platform when the latter is raised, means for limiting the inward movement of said upper ends, a three-arm lever pivoted to the frame work at one side of the machine, a link connecting one of its arms with the upper end of the stop on this side of the machine, an arm depending rigidly below the pivot of the stop at the opposite side of the machine, a link connecting this arm with the second arm of said lever, and means for manipulating the third arm of said lever.

5. In an elevator of the character described, the combination with a frame work, a platform disposed therein and provided with channeled rails for the reception of the wheels of a vehicle, and elevating mechanism carried by the frame work for raising and lowering said platform; of stops pivoted at their lower ends to the frame work, springs bearing their upper ends normally inward beneath the platform when the latter is raised, means for limiting the inward movement of said upper ends, a three arm lever pivoted to the frame work at one side of the machine, a link connecting one of its arms with the upper end of the stop on this side of the machine, an arm depending rigidly below the pivot of the stop at the opposite side of the machine, a link connecting this arm with the second arm of said lever, trip-mechanism connected with the third arm of said lever for moving it in either direction, and means for holding the lever at either extreme of its movement.

6. In an elevator of the character described, the combination with a frame work, a platform movable therein, and the elevating mechanism for raising and lowering it; of stops pivoted at their lower ends in said frame work with their upper ends adapted to be projected beneath the platform when the latter is raised, a lever for moving the upper ends of said stops inward and outward in pairs, a centrally pivoted rock lever, a bent link connecting its upper arm with one arm of said stop-actuating lever, the point of connection between the levers passing the pivot of the rock lever when the other lever is raised, and means connected with the other arm of the rock lever for swinging it on its pivot.

7. In an elevator of the character described, the combination with a frame work, a platform movable therein, and the elevating mechanism for raising and lowering it; of stops pivoted at their lower ends in said frame work with their upper ends adapted to be projected beneath the platform when the latter is raised, a lever for moving the upper ends of said stops inward and outward in pairs, a centrally pivoted rock lever, a bent link connecting its upper arm with one arm of said stop-actuating lever, the point of connection between the levers passing the pivot of the rock lever when the other lever is raised, a treadle pivoted at one end and having a foot piece at the other end, and a link connecting its mid-length with the other arm of said rock lever, for the purpose set forth.

8. In an elevator of the character described, the combination with a frame work including four standards, each consisting of a pair of posts separated by blocks, and the elevating mechanism; of a platform raised by said mechanism within the frame work, and guide rollers mounted in brackets on the platform and engaging said standards so as to permit the rise and fall and the tilting of the platform.

In testimony whereof I have hereunto set my hand in presence of two subscribing witnesses.

BENJAMIN F. WILSON.

Witnesses:
L. O. HILTON,
G. W. MUDD.